Feb. 21, 1967  P. S. EMERY, JR  3,304,903
SEPARABLE WATER SKI BAR
Filed Oct. 6, 1965
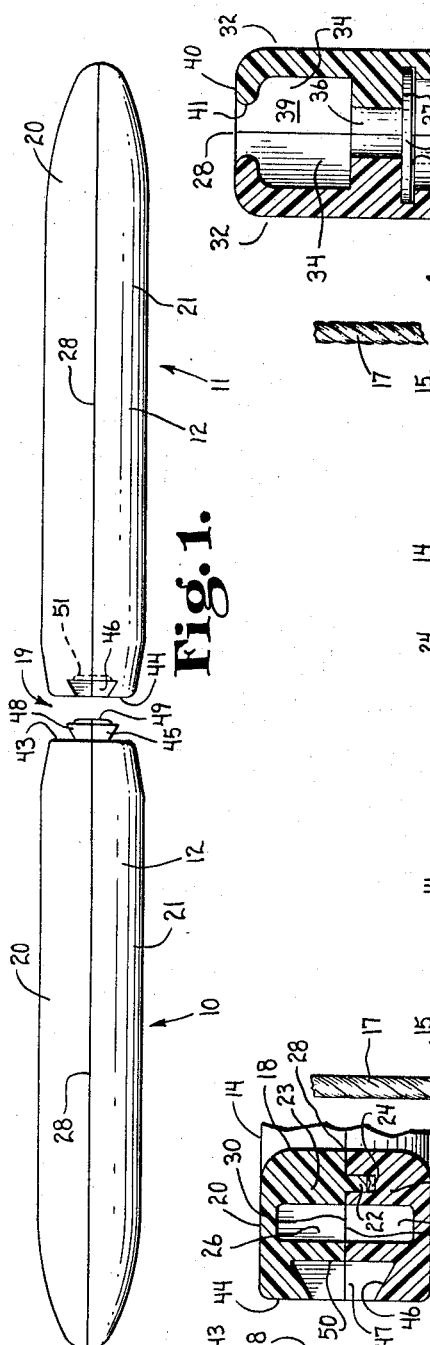
INVENTOR.
PARFITT S. EMERY, JR.
BY Hood, Gust & Irish
Attorneys

United States Patent Office 3,304,903
Patented Feb. 21, 1967

3,304,903
SEPARABLE WATER SKI BAR
Parfitt S. Emery, Jr., 200 N. 3rd St.,
Elwood, Ind. 46306
Filed Oct. 6, 1965, Ser. No. 493,497
10 Claims. (Cl. 115—6.1)

The present invention concerns a handle for sporting equipment and relates particularly to a novel handle for use in water skiing.

Two major types of towrope handles are currently in use for water skiing. One type has a single handle bar, long enough to be gripped by both hands; the other type is in the form of two shorter bars, one being held in each hand. While some water skiers prefer to use one or the other of these types of handles exclusively, most will have occasion to use both types and will prefer one type over the other for different applications. Consequently, many water skiers have both types of handle, and two towropes as well, since each type requires a different configuration for its associated towrope.

A primary objective of my invention is a separable towrope handle adapted to function either as a single longer handle or as two shorter handles. Another objective is a handle which can be changed from one of these configurations to the other easily and quickly, even while the skier is in motion.

Additional objects of the invention are a separable handle which will float in water and one which is light, strong and easily manufactured.

To the accomplishment of the above and related objects, my invention may be embodied in the form illustrated in the accompanying drawings, attention being called to the fact, however, that the drawings are illustrative only, and that changes may be made in the specific construction illustrated and described, so long as the scope of the appended claims is not violated.

FIG. 1 is a rear view of the preferred embodiment of the handle;

FIG. 2 is a top view of the handle, partially broken away to show details of construction;

FIG. 3 is an enlarged, fragmentary, sectional view of the cooperating means for releasably engaging the handle segments to each other, taken along the line 3—3 of FIG. 2; and FIG. 4 is an enlarged, fragmentary, sectional view of a socket for holding an end of a towrope, and is taken along line 4—4 of FIG. 2.

Referring more particularly to the drawings, the reference numeral 10 indicates a first handle segment, and the numeral 11 indicates a second handle segment. Both handle segments are generally toroidal in shape. A rearward portion of each handle segment forms a straight hand bar 12 long enough to accommodate one hand comfortably and about one inch in diameter, experience having shown this diameter to be optimum. A portion of the surface of each hand bar 12 is roughened or stippled to provide a good grip. At the outer end of each hand bar 12 is a brace 13, whose forward end meets the outer end of a frontal bar 14. The frontal bar 14 is provided with a socket, indicated generally by 15, for holding a knotted or otherwise suitably enlarged end 16 of one of two separate towropes or of one arm of a hyoid towrope 17. The inner end of the frontal bar 14 is joined to the inner end of the hand bar 12 by a straight longitudinal bar 18. These longitudinal bars 18 carry the cooperating means, indicated generally by 19, for releasably engaging the handle segments 10 and 11 to each other.

In the preferred embodiment of the invention, each handle segment 10 and 11 is constructed from two mating shells 20 and 21, which may be manufactured from a suitable plastic by injection molding. Each shell 20 carries a number of dowel pins 22 extending from shoulders 23; each shell 21 is provided with corresponding dowel sockets 24 formed in shoulders 25. A series of transverse interior struts 26 in each shell 20 is matched by a similar series of struts 27 in each shell 21. When the shells 20 and 21 have been assembled by fitting the dowel pins 22 into the dowel sockets 24 and welding the seams 28, the edges 29 of the struts 26 are in abutting registry with the edges 30 of the struts 27. The corresponding struts 26 and 27 thus act not only to impart added strength to the handle segments 10 and 11, but also to divide their now water-tight interiors into a number of cells 31 separated by bulkheads. This cellular flotation chamber allows the handle segments 10 and 11 to float in water despite a small puncture or leak in the mating shells 20 and 21.

Each towrope socket, indicated generally by 15, is made up of two identical socket halves 32, one socket half being formed in each of the mating shells 20 and 21. Tightly abutting stepped walls 33 and 34 serve to maintain the water-tight integrity of the handle segments 10 and 11. The surface of each socket half 32 defines a wider semicircular region 35, a narrower semicircular region 36, a shoulder 37 between the regions 35 and 36, and a circumferential groove 38 opposite the shoulder 37. Forward of the socket half proper, a passage 39 opens through the edge 40 of the frontal bar 14 in a lip 41 rounded to prevent chafing of the towrope 17 thereagainst. The groove 38 is adapted to receive an annular insert 42, such as a standard metal washer. When the mating shells 20 and 21 have been assembled, the insert 42 is held snugly against the shoulder 37 to distribute the tension from the enlarged towrope end 16 over a larger area of the shoulder 37.

The longitudinal bars 18 have flat, mutually confronting faces 43 and 44, which carry the cooperating means 19 for releasably connecting the handle segments 10 and 11. The face 43, located on the handle segment 10, carries a dovetail tenon 45 along the greater part of its length; the face 44, located on the handle segment 11, is provided with a mating, half-blind, rearwardly-opening, dovetail groove 46 having a stop 47 at its forward end. The top surface 48 of the dovetail tenon 45 has a small, rounded projection 49 near its rearward end, and the bottom surface 50 of the dovetail groove 46 shows a corresponding dimple 51. The handle segments 10 and 11 are coupled together by sliding the dovetail tenon 45 forwardly into the groove 46 until its forward end 52 meets the stop 47; at this point, the projection 49 will engage the dimple 51 to resist relative movement and accidental decoupling of the handle segments 10 and 11. Locating the projection 49 and the dimple 51 near the rearward ends of the tenon 45 and groove 46 facilitates the engagement and disengagement of the handle segments 10 and 11 in that the projection 49 need be forced along the groove surface 50 for only a short distance. It has been found that, although the handle segments 10 and 11 are held together securely despite the vibration and shocks encountered in water skiing, they may nevertheless be separated easily, even during the course of skiing, by imparting a steady forward pressure on the hand bar 12 of the segment 11 and a simultaneous rearward pressure on the hand bar 12 of the segment 10. Furthermore, the engagement of the projection 49 by the dimple 51 results in audible and tactile sensations, ensuring that the segments 10 and 11 have been properly connected.

I claim as my invention:

1. A handle for a water ski towrope or the like, comprising two generally allochiral handle segments, each handle segment comprising a hand bar and a longitudinal bar substantially perpendicular to said hand bar, said longitudinal bars being adapted to be arranged in juxtaposition when said hand bars are aligned, and cooperating means carried by said longitudinal bars for releasably connecting said handle segments together, said cooperating means being releasable and engageable by relative movement of said handle segments in directions perpendicular to said hand bars.

2. A handle for a water ski towrope or the like, comprising two handle segments, each handle segment being provided with a hand bar and a socket for holding a suitably enlarged end of a towrope, and cooperating means carried by said handle segments for releasably connecting said handle segments together, in which said cooperating means comprises a dovetail tenon extending from one of said handle segments and a corresponding dovetail groove formed in the other of said handle segments.

3. The handle of claim 2 in which said dovetail groove is provided with a dimple on one of its surfaces and in which said dovetail tenon carries a projection cooperative with said dimple to hold said handle segments together releasably.

4. The handle of claim 1 in which one of said longitudinal bars is provided with a dovetail tenon extending therefrom and the other of said longitudinal bars is provided with a cooperating dovetail groove.

5. The handle of claim 1 in which each of said handle segments is formed with a socket comprising a stepped hole extending longitudinally through said handle segment and having a wide portion, a narrow portion, a shoulder therebetween and a circumferential groove opposite said shoulder, and an annular strain-relieving insert adapted to be received snugly in said circumferential groove.

6. A handle for a water ski towrope or the like, comprising two generally toroidal handle segments, each handle segment being provided with a hand bar and a socket for holding a suitably enlarged end of a towrope perpendicular to said hand bar and cooperating means carried by said handle segments, said cooperating means being mutually separably engageable, by relative movement in directions perpendicular to said hand bars, to establish a rigid connection between said handle segments.

7. The handle of claim 6 in which each of said handle segments has at least one flat face, said cooperating means being located respectively on the flat faces of said handle segments and being mutually engageable by relative movement of said handle segments in the direction of the length of said straight sides.

8. A handle for a water ski towrope or the like, comprising two handle segments, each handle segment being constructed of two mating shells welded together to form a flotation chamber therebetween and each handle segment being provided with a hand bar and a socket for holding a suitably enlarged end of a towrope and cooperating means carried by said handle segments for releasably connecting said handle segments together.

9. The handle of claim 8 in which said socket comprises a socket half formed in each of said mating shells, each socket half being provided with a circumferential groove and an annular strain-relieving insert adapted to be held in said grooves.

10. The handle of claim 8 in which one of said mating shells is provided with a number of transverse interior struts adapted to abut corresponding struts provided in the other of said mating shells when said mating shells have been assembled.

References Cited by the Examiner

UNITED STATES PATENTS

| | | | |
|---|---|---|---|
| 3,051,118 | 8/1962 | Calk et al. | 115—6.1 |
| 3,196,825 | 7/1965 | Spurlock | 115—6.1 |
| 3,219,007 | 11/1965 | Kiefer | 115—6.1 |

MILTON BUCHLER, *Primary Examiner.*

T. M. BLIX, *Assistant Examiner.*